United States Patent [19]

Holt

[11] 4,130,862

[45] Dec. 19, 1978

[54] DC POWER SUPPLY

[75] Inventor: Frederick R. Holt, Saratoga, Calif.

[73] Assignee: Apple Computer, Inc., Cupertino, Calif.

[21] Appl. No.: 874,124

[22] Filed: Feb. 1, 1978

[51] Int. Cl.² .................................. H02M 3/335
[52] U.S. Cl. ................................ 363/49; 363/21
[58] Field of Search .......................... 363/18–21, 363/30, 49

[56] References Cited

U.S. PATENT DOCUMENTS

| 2,920,259 | 1/1960 | Light | 363/18 |
| 3,504,263 | 3/1970 | Schaefer | 363/49 X |
| 3,523,235 | 8/1970 | Schaefer | 363/49 X |
| 4,063,307 | 12/1977 | Stephens | 363/49 X |

OTHER PUBLICATIONS

IBM Technical Disclosure Bulletin, "Transistor Switching Regulator Start Circuit", W. A. Moorman, vol. 13, No. 9, Feb. 1971, p. 2763.

Primary Examiner—William M. Shoop
Attorney, Agent, or Firm—Blakely, Sokoloff, Taylor & Zafman

[57] ABSTRACT

A direct current (DC) power supply of the single-ended flyback type particularly suited for providing power for integrated circuits is described. The power supply is self-exciting and thus does not employ an auxiliary drive or oscillator. The starting/restarting circuitry provides protection against faults. Because of this fault protection, a relatively simple over-voltage circuit is employed at the output of the supply. An additional primary winding is used to provide protection for no-load conditions.

11 Claims, 1 Drawing Figure

DC POWER SUPPLY

BACKGROUND OF THE INVENTION

1. Field of the Invention

The invention relates to the field of DC power supplies.

2. Prior Art

DC power supplies which employ transformers to convert a first DC potential to a second DC potential are well-known. In some cases, these supplies are single-ended, that is, magnetic flux is induced in only one direction within the transformer. Most often these power supplies are of the "flyback" type, that is, power is transferred after conduction has ceased in the primary winding. Regulation of the output voltage is accomplished by controlling the amount of energy stored in the magnetic field of the transformer. This is generally done by controlling the peak current in the primary winding through a power transistor.

For the self-exciting type of power supply, an auxiliary drive or oscillator is often employed to initiate oscillations. As will be seen, the starting/restarting circuitry employed with the present invention consists substantially of passive circuit components which are inherently reliable. This circuitry also provides excellent fault protection.

In flyback systems employing transformers, a problem has existed in dissipating all the energy stored in the magnetic field of the transformer. Because of stray inductance and capacitance, and because complete magnetic coupling does not occur between the primary and secondary windings, all the energy introduced in the magnetic field from the primary winding is not coupled to the secondary winding. Typically, some of the energy stored in the field is dissipated in the power transistor which controls the current in the primary drive winding and in damping diode networks, etc. This subjects these components to severe stress in some cases. Moreover, when a fault condition occurs such as an open secondary, or a no-load condition, all of the energy stored in the magnetic field must be dissipated on the primary side. As will be seen with the present invention, an additional primary winding is employed which in effect returns a substantial amount of the energy in the magnetic field which is not transferred to the secondary winding, back into the primary power supply.

SUMMARY OF THE INVENTION

A direct current power supply of the single-ended flyback type is described. The power supply includes a transformer which has at least one primary winding and at least one secondary winding. The primary winding is coupled between a source of direct current potential and the collector of a power transistor. Starting means are employed to initiate oscillations in the power supply. The starting means are coupled to the emitter of the power transistor and initiate oscillations by causing a relatively low current flow through the emitter of the power transistor. In the presently preferred embodiment, the starting means comprises a series connected capacitor and resistor which are coupled to receive the negative portion of the AC line supply. When a fault occurs which causes the oscillations in the power supply to cease, the starting circuit attempts to restart oscillations. Even if the fault remains, attempts to restart the oscillations do not harm the supply since the emitter current drawn by the starting means is low.

BRIEF DESCRIPTION OF THE DRAWING

The FIGURE is an electrical schematic of the presently preferred embodiment of the invented DC power supply.

DETAILED DESCRIPTION OF THE INVENTION

Figure 1:
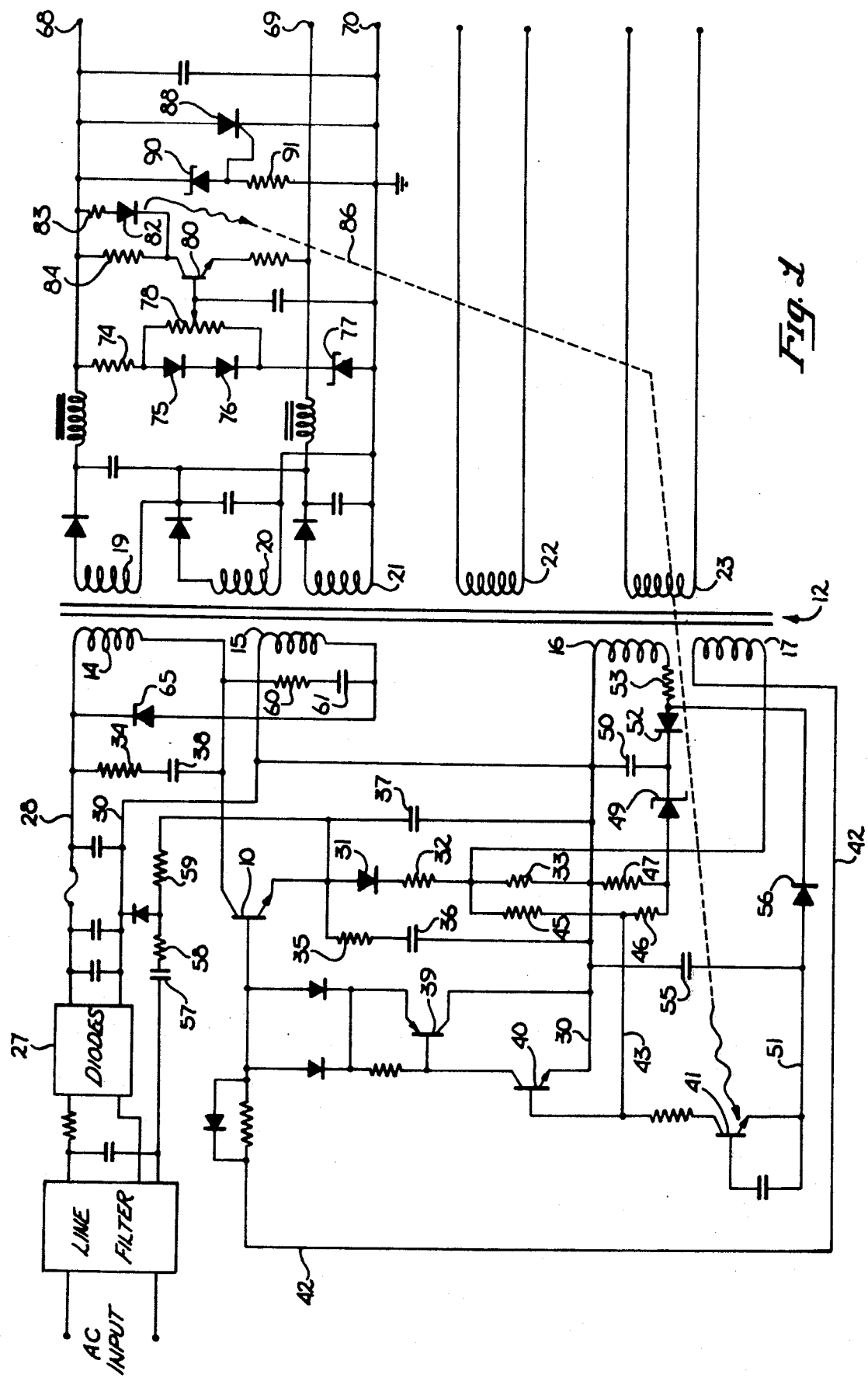

A direct current (DC) power supply which is particularly suited for providing power for integrated circuits is described. In the following description, numerous well-known concepts associated with DC power supplies of the type described have not been set forth in detail in order not to obscure the present invention in unnecessary detail. In other instances, specific details are set forth in order to provide a thorough understanding of the present invention. However, it will be obvious to one skilled in the art that the invention may be practiced without employing these specific details.

The described DC power supply is of the general type which converts energy from a first (primary) DC power supply into magnetic energy, and then converts this magnetic energy into a second (output) DC potential. This "through convertion type" power supply, in the presently preferred embodiment, employs a double wound transformer with the energy transferred to the secondary windings during the flyback cycle, that is, when conduction has ceased in the primary drive winding. The output DC potential is regulated by controlling the peak current in the primary drive winding.

Referring now to the FIGURE, the transformer 12 includes a plurality of primary windings 14, 15, 16 and 17, and a plurality of secondary windings 19, 20, 21, 22 and 23. The primary drive winding 14 transfers energy from the primary DC supply into the magnetic energy of the transformer. The parasitic winding 15 has the same number of turns as the winding 14 for reasons which will be described in greater detail. The winding 16 is employed to provide a control potential for controlling the current through the drive winding 14. The feedback winding 17 provides a positive feedback signal for the power transistor 10. The secondary windings 19, 20, 21, 22 and 23, include rectification means which assure that current flows in the secondary windings only during the flyback period to provide the DC outputs. In the presently preferred embodiment, a gapped transformer is employed having an air gap of approximately 0.0028 inches. With this gap, substantially all of the energy associated with the magnetic field is stored in the air gap rather than in the ferromagnetic core of the transformer.

The primary DC supply is derived from an alternating current (AC) line source. This source is coupled through a line filter to a diode bridge 27. The output of this diode bridge provides a positive DC potential on line 28. This DC potential is coupled to one lead of the primary drive winding 14. The other lead of this winding is coupled to the collector terminal of the transistor 10. As will be described in greater detail, the transistor 10 is used to control the flow of current through the drive winding 14. The line 28 is also coupled to the collector terminal of the transistor 10 through the resistor 34 and capacitor 38.

The parasitic winding 15 which in one embodiment may be bifilar with the primary winding 14 has one of its leads coupled through diode 65 to line 28. This lead is also coupled to the collector terminal of transistor 10 through the capacitor 61 and resistor 60. The other lead of the winding 15 is coupled to the ground node 30.

A starting circuit is employed to initiate oscillations for the power supply. (Oscillations refer to the repeated building up and decaying of the magnetic energy in the transformer 12 and the related currents). This starting circuit includes a resistor 35 of relatively high resistance which is coupled in series with capacitor 36 between the emitter terminal of transistor 10 and the ground node 30. The capacitor 36 is charged, as will be described, by the negative portion of the AC supply through a charging circuit. Coupling to the AC supply is obtained through capacitor 57 and resistor 58. One terminal of resistor 58 is coupled through the diode 62 to the ground node. Resistor 58 is also coupled to the emitter terminal of transistor 10 through the resistor 59. The emitter terminal of transistor 10 is coupled to the ground node through a relatively small capacitor 37 which, as will be explained, provides high frequency bypass. The main emitter current path during normal (heavy) oscillations includes the diode 31, the current limiting resistor 32, and resistor 33, all of which are coupled in series between the emitter terminal of the transistor 10 and the ground node 30.

Regulation of the DC output potentials is obtained by controlling the turnoff of transistor 10 through an active turnoff circuit which includes transistors 39, 40 and 41. Positive feedback from the winding 17 is coupled through line 42 and the parallel combination of a resistor and diode to the base terminal of the transistor 10. The base terminal of transistor 10 is coupled through a diode to the emitter terminal of the transistor 39. This emitter terminal of transistor 10 is also coupled through another diode and a resistor to the collector terminal of the transistor 40. The emitter terminal of transistor 40 and the collector terminal of transistor 39 are coupled to the ground node 30.

The base terminal of the transistor 40 is coupled to line 43. This line is coupled to the collector terminal of a light-sensitive transistor 41 through a resistor. The emitter terminal of transistor 41 is coupled to line 51, also the base terminal of this transistor is coupled to line 51 through a capacitor. The ground node 30 is coupled to line 51 through a capacitor 55. Line 51 is coupled to one lead of the primary winding 16 through a diode 56 and a resistor 53. The common junction between the diode 56 and resistor 53 is coupled through a diode 52 to one terminal of a capacitor 50. The other terminal of this capacitor and the other lead of the winding 16 are coupled to the ground node 30. The capacitor 50 is coupled through the Zener diode 49 to resistors 46 and 47. The resistor 47 is coupled to the ground node 30 while the resistor 46 is coupled to line 43. Line 43 is also coupled through resistor 45 to the junction between resistors 32 and 33; this junction is common with one lead of the feedback winding 17.

In the presently preferred embodiment, the power supply provides +12 volts on line 68 and +5 volts on line 69. The windings 22 and 23 are coupled to rectification means to provide output potentials of −5 volts and −12 volts. These rectification means are well-known means and are not illustrated in the FIGURE.

The windings 19, 20 and 21 are coupled through diodes to provide a positive potential on the lines 68 and 69 with reference to the ground line 70. Capacitors and inductors are employed in a well-known manner to provide filtering of these DC potentials as shown in the drawing.

A transistor 80 which is employed as a comparator, as will be explained, has its collector terminal coupled to line 68 through resistor 84 and through the series combination of resistor 83 and light-emitting diode 82. The light-emitting diode 82 is optically coupled to the light-sensitive transistor 41 as indicated by the path 86. The emitter terminal of the transistor 80 is coupled through a resistor to line 69. The base terminal of this transistor is coupled to the potentiometer 78. This potentiometer is coupled across the diodes 75 and 76. Diodes 75 and 76 are coupled to line 68 through the resistor 74 and to ground through the Zener diode 77. The Zener diode 77 provides a reference potential for the base of transistor 80. This Zener diode is temperature compensated by the diodes 75 and 76.

Over-voltage protection is provided through the silicon controlled rectivier (SCR) 88. This SCR is coupled between the lines 68 and 70. A triggering potential for the gate terminal of this device is provided by the Zener diode 90, which diode is coupled in series with resistor 91 between line 68 and ground. As is apparent, when the potential on line 68 exceeds a predetermined value (over-voltage) the Zener diode 90 conducts, thereby triggering the SCR 88. When the SCR 88 is triggered, line 68 is directly coupled to line 70 thereby shorting the over-voltage condition.

As mentioned, the power supply is self-exciting, thus it requires some means for initiating oscillations. A portion of the AC signal is coupled through the capacitor 57 to the emitter terminal of transistor 10. Because of the diode 62 and the resistors 58 and 57, only a portion of the negative potential is coupled to the emitter terminal. The diode 31 prevents this negative potential from being coupled to the ground node 30. As negative charge accumulates on the capacitor 36 it eventually lowers the emitter potential to approximately −0.6 volts at which time approximately 15 mA of emitter current flows through the emitter of the transistor 10. The transistor 10, assuming there are no faults, has substantial power gain. (The DC potential for the presently preferred embodiment on line 28 is approximately 140 to 200 volts). The positive feedback to the emitter of transistor 10 from the winding 17 along with the fact that high frequency signals are bypassed through the capacitor 37 causes rapid regeneration oscillations to start. During these oscillations current flows through the winding 14, through transistor 10 to the ground node 30 through the diode 31 and resistors 32 and 33. These oscillations once initiated are sustained through known phenomena. Such oscillations as is well-known rely upon stray capacitance and inductance, and upon the ringing of the underdamped system to reinitiate conduction in transistor 10 after the flyback portion of the cycle. During these oscillations, the capacitors 36 and 37 play substantially no part in the operation of the circuit, and in fact, the emitter terminal of transistor 10 rises to a potential of approximately 2.4 volts in the presently preferred embodiment.

Once heavy oscillations are underway and power is being transferred to the secondary windings, the turnoff point of transistor 10 is controlled by transistors 39 and 40. These transistors shunt base current from transistor 10 and act as an active turn-off circuit. Transistors 39 and 40 are coupled to sense both the AC line potential and the DC output potential. Local loop regulation is provided by the winding 16 and the potential which is developed across capacitor 50. Conditions such as heavy loads affect the potential developed across the capacitor 50. The potential across this capacitor since it is coupled to the base of transistor 40 partly controls the turn-off point of the transistor 10.

On the output side of the power supply, the transistor 80 compares the reference potential which is developed by Zener diode 77 with its emitter potential. The emitter potential is a function of the output potential on line 69. The results of this comparison determine the amount of current which flows through the light-emitting diode 82. The amount of current through this diode regulates the characteristics of the transistor 41. This transistor controls the turn-off point for transistor 10 since transistor 41 is coupled to the base of transistor 10 through transistors 39 and 40.

By way of example, if the potential on line 69 drops it will cause more current to flow through the light-emitting diode 82. The additional light from this diode causes the transistor 41 to become more conductive. This greater conductance of transistor 41 lowers the potential applied to the base of transistor 40. This prevents transistor 40 from conducting as readily as it might otherwise conduct, and hence less base current for transistor 10 is shunted through this transistor. Thus more positive feedback through line 42 reaches the transistor 10, increasing the maximum current which flows through the drive coil 14. This additional current results in more energy transfer to the secondary windings, thereby increasing the potential on line 69. The other DC output potentials follow this regulation loop.

Assume for sake of discussion that a fault condition occurs such as a short at the output of the power supply or a short caused by the conduction of the SCR 88. This fault substantially reduces the power gain associated with transistor 10 and causes the heavy oscillations to cease. The current through the current limiting resistor 32 also ceases. This allows the capacitor 30 to slowly become negatively charged again. The time constant associated with this charging is made relatively long to give time for fault correction. As the potential on the emitter of transistor 10 becomes negative, the relatively small emitter current is again drawn and the circuit attempts to oscillate. If the fault is removed, heavy oscillations occur and power is transferred to the secondary windings. On the other hand, if the fault remains the circuit nonetheless attempts to restart. These continued attempts to restart do not damage the circuit since the emitter current is relatively low (12 ma for the presently preferred embodiment). Thus, the restarting circuitry provides protection against faults since unsuccessful, continued attempts to restart do not damage the supply.

As previously mentioned, one inherent problem in flyback type systems in that all the energy stored in the magnetic field is not linked to the secondary windings, and thus a portion of this energy must be dissipated on the primary side of the supply, particularly in the power transistor and other circuit components. This problem is greatly aggravated during a no-load condition when all the power stored in the transformer must be dissipated on the primary side. Because of the winding 15 and its interconnection with the primary DC supply, a substantial portion of this non-transferred energy is returned to the primary D.C. supply. Assume for purposes of explanation that the secondary windings are open. When condition ceases through transistor 10, a substantial amount of energy is stored within the magnetic field of the transformer. At the moment that conduction ceases, the potential on the collector terminal of transistor 10 begins to rise sharply. At the same time, the potential on the ungrounded lead of the winding 15 rises in the positive sense. This potential is equal to the potential on the collector terminal of the transistor less the DC component on line 28. When the potential on the collector of transistor 10 reaches twice the potential of the DC supply, the potential on the ungrounded lead of winding 15 approximately equals the potential on line 28 causing diode 65 to conduct. The current through this diode is approximately equal to the peak current drawn by transistor 10 during the on-time of this transistor. This current returns substantially all the energy from the magnetic field back to the primary DC power supply. Were it not for the parasitic winding 15, this energy would be dissipated within the power supply and could destroy the transistor 10. In practice, not all the energy is returned to the DC power supply because of copper and iron losses, losses in the transistor and the fact that perfect linkage does not exist between the windings 14 and 15. Also in practice, the parasitic winding 16 is more economical to fabricate when wound on a separate layer rather than as a bifilar winding. This, of course, increases the leakage inductance. To compensate for this, the two windings are coupled together through the capacitor 61 and resistor 60. It is estimated that in the presently preferred embodiment, approximately 1/10 of the energy that would be otherwise returned to the primary DC power supply is lost through resistors 34 and 60.

Thus, a DC power supply has been disclosed of the general single-ended flyback type. The starting circuit for the power supply provides protection against faults. An additional primary winding which is coupled to the drive winding allows the return of non-transferred energy to the primary DC power supply. This feature reduces the stress on components during no-load conditions and the like.

I claim:
1. A direct current power supply comprising:
   a transformer having at least one primary winding and one secondary winding, one lead of said primary winding for coupling to a source of direct current;
   a transistor having a collector, base, and emitter terminal, said collector terminal coupled to the other lead of said primary winding;
   starting means for initiating oscillations such that power may be transferred through said transformer from said primary winding to said secondary winding, said starting means comprising a first resistor and first capacitor coupled to the emitter terminal of said transistor and charging means for charging said first capacitor, said starting circuit for controlling the flow of emitter current so as to initiate said oscillations without damaging said transistor;
   rectification means coupled to said secondary winding for providing an output direct current potential;
   whereby oscillations are initiated in said direct current power supply without damage to said supply during a fault condition.

2. The power supply defined by claim 1 including a second resistor for limiting said emitter current.

3. The power supply defined by claim 2 including a diode coupled in series with said second resistor to allow the charging of said first capacitor without loss of current through said second resistor.

4. The power supply defined by claim 3 including second rectification means for coupling to an alternating current source and for providing said source of direct current for said primary winding.

5. The power supply defined by claim 4 wherein said charging means couples a portion of alternating current from said alternating current source to said first resistor for charging said first capacitor.

6. The power supply defined by claim 5 including a second capacitor coupled to said emitter terminal for providing a high frequency bypass to aid in the initiation of said oscillations.

7. The power supply defined by claim 1 wherein said starting circuit is effectively decoupled from said emitter terminals once oscillations are initiated.

8. A direct current power supply comprising:
a transformer having at least a first primary winding and a second primary winding and at least one secondary winding, one lead of said first primary winding coupled to a DC source;
a transistor having its collector terminal coupled to the other lead of said first primary winding for controlling the flow of current in said first primary winding;
starting means for initiating current flow in said transistor coupled to said transistor;
said second primary winding coupled to said first primary winding such that energy stored in the field of said transformer may flow to said DC course from said second primary winding;
a circuit means interconnecting said first and said second primary windings for compensating for leakage inductance;
whereby during a no load condition said energy stored in said transformer is returned to said DC source thereby protecting said power supply.

9. The power supply defined by claim 8 wherein said first and second primary windings are coupled through a diode.

10. The power supply defined by claim 8 wherein said starting means comprises a capacitor and resistor coupled to the emitter terminal of said transistor, said resistor coupled to receive a portion of an AC signal.

11. The power supply defined by claim 9, wherein said circuit means comprises a series coupled resistor and capacitor.

* * * * *